(12) United States Patent
Markus

(10) Patent No.: US 12,045,160 B2
(45) Date of Patent: Jul. 23, 2024

(54) SYSTEMS AND METHODS FOR TRAINING SYSTEMS TO DETECT SOFTWARE BUGS

(71) Applicant: Aries Security, LLC, Wilmington, DE (US)

(72) Inventor: Brian Markus, El Dorado Hills, CA (US)

(73) Assignee: Aries Security, LLC, Wilmington, DE (US)

( * ) Notice: Subject to any disclaimer, the term of this patent is extended or adjusted under 35 U.S.C. 154(b) by 393 days.

(21) Appl. No.: 17/296,813

(22) PCT Filed: Nov. 26, 2019

(86) PCT No.: PCT/US2019/063287
§ 371 (c)(1),
(2) Date: May 25, 2021

(87) PCT Pub. No.: WO2020/112800
PCT Pub. Date: Jun. 4, 2020

(65) Prior Publication Data
US 2022/0004484 A1    Jan. 6, 2022

Related U.S. Application Data

(60) Provisional application No. 62/771,345, filed on Nov. 26, 2018.

(51) Int. Cl.
*G06F 11/36* (2006.01)
*G06F 21/53* (2013.01)
*G06F 21/57* (2013.01)

(52) U.S. Cl.
CPC ...... *G06F 11/3688* (2013.01); *G06F 11/3692* (2013.01); *G06F 21/53* (2013.01); *G06F 21/577* (2013.01); *G06F 2221/033* (2013.01)

(58) Field of Classification Search
CPC .. G06F 11/3688; G06F 11/3692; G06F 21/53; G06F 21/577; G06F 2221/033; G06F 11/366; G06F 21/55; G06F 11/0751
(Continued)

(56) References Cited

U.S. PATENT DOCUMENTS 9,600,386 B1* 3/2017 Thai ............ G06F 11/263
2017/0220972 A1* 8/2017 Conway ........ G06Q 10/063118

* cited by examiner

*Primary Examiner* — Yair Leibovich
(74) *Attorney, Agent, or Firm* — Dinsmore & Shohl LLP

(57) ABSTRACT

A method is disclosed and includes receiving, using a first client computing system, an instance from an administrative computing system. The instance includes a partition of computing resources of the administrative computing system. The partition of computing resources includes a virtual processor and first machine-readable instructions. The first machine-readable instructions include a first predefined software bug. The method includes executing, using the virtual processor, the first machine-readable instructions. Executing the first machine-readable instructions includes receiving, using the virtual processor, a first input indicating an identification of the first predefined software bug of the first machine-readable instructions. Executing the first machine-readable instructions includes transmitting, using the virtual processor, a first signal associated with the first input to the administrative computing system, wherein the first signal causes the administrative computing system to generate a score associated with the first client computing system in response to verification by the administrative computing system.

20 Claims, 9 Drawing Sheets

(58) Field of Classification Search
USPC .......................................................... 714/38.1
See application file for complete search history.

| LOAD | CWE | MONITOR | ACTIVE | HISTORY |

CHOOSE SKILLS — 345

| CHOOSE CWE | | | | |
|---|---|---|---|---|
| CWE-121 | CWE-23 | CWE-134 | CWE-287 | CWE-676 |

| CHOOSE VULNERABILITY TYPE | | | | |
|---|---|---|---|---|
| STACK BASED BUFFER OVERFLOW | RELATIVE PATH TRAVERSAL | UNCONTROLLED FORMAT STRING | IMPROPER AUTHENTICATION | USE OF POTENTIALLY DANGEROUS FUNCTION |

CHOOSE CATEGORIES — 350

— 355

SERVICE: MESSENGER

| CWE # | CWE DESCRIPTION | DESCRIPTION | DIFFICULTY | INCLUDE |
|---|---|---|---|---|
| CWE-121 | STACK BASED BUFFER OVERFLOW | VARIABLE DURING TELNET NEGOTIATIONS | MEDIUM | ☑ |
| CWE-23 | RELATIVE PATH | DIRECTORY TRAVERSAL IN NAMING CLIENT MESSAGE | EASY | ☑ |
| CWE-134 | UNCONTROLLED FORMAT STRING | FORMAT STRING BUG IN THE ADMIN DEBUG PAGE | MEDIUM | ☐ |
| CWE-287 | IMPROPER AUTHENTICATION | BROKEN AUTHENTICATION LOGIC THAT ALLOWS BYPASSING OF PASSWORD AUTHENTICATION | EASY | ☑ |
| CWE-676 | POTENTIAL USE OF DANGEROUS FNCTN | MANIPULATING THE PERCEIVED SIZE OF THE WINDOW BY SENDING MALICIOUS NAWS SUBOPTION MESSAGES | HARD | ☑ |
| CWE-121 | STACK BASED BUFFER OVERFLOW | BUFFER OVERFLOW WHILE GETTING THE FILENAME INPUT | MEDIUM | ☑ |

SET ROUND SETTINGS

360 →

| SCENARIO LABEL | GAME LENGTH (HOURS) | ROUND TIME (MINUTES) |
|---|---|---|
|  | 120 | 2 |

| RESET | SAVE | NEXT |

FIG. 3B  340

SYSTEMS AND METHODS FOR TRAINING SYSTEMS TO DETECT SOFTWARE BUGS

CROSS REFERENCE TO RELATED APPLICATIONS

This application is a National Phase Entry of International Application No. PCT/US2019/063287, entitled "SYSTEMS AND METHODS FOR TRAINING SYSTEMS TO DETECT SOFTWARE BUGS" and filed on Nov. 26, 2019, which claims the priority benefit of U.S. Provisional Application No. 62/771,345, filed on Nov. 26, 2018 and entitled "Systems and Methods for Training Bug Detection Algorithms," the entire contents of both are incorporated herein by reference.

FIELD

The present disclosure relates to systems and methods for software bug detection and, more particularly, allowing for exploitation of weaknesses within the computing system and software, in turn allowing for compromise of the system and software. Accordingly, a need exists to train end users to dynamically identify vulnerabilities (e.g., software bugs), exploit said vulnerabilities, and remediate said vulnerabilities.

BACKGROUND

Computing systems may be vulnerable to malicious manipulation caused by third parties, allowing for exploitation of weaknesses within the system or software, in turn allowing compromise of the system or software. Accordingly, a need exists for software bug detection systems that train users and/or computer systems to dynamically identify and remedy malicious manipulations to simulated application and network services.

SUMMARY

In an aspect, a method includes receiving, using a first client computing system, an instance from an administrative computing system, wherein the instance includes a partition of computing resources of the administrative computing system. The partition of computing resources includes a virtual processor and first machine-readable instructions. The first machine-readable instructions include a first predefined software bug. The method includes executing, using the virtual processor, the first machine-readable instructions. Executing the first machine-readable instructions includes receiving, using the virtual processor, a first input indicating an identification of the first predefined software bug of the first machine-readable instructions. Executing the first machine-readable instructions includes transmitting, using the virtual processor, a first signal associated with the first input to the administrative computing system, wherein the first signal causes the administrative computing system to generate a score associated with the first client computing system in response to verification by the administrative computing system.

In another aspect, a method includes receiving, using a first client computing system, an instance from an administrative computing system, wherein the instance includes a partition of computing resources of the administrative computing system. The partition of computing resources includes a virtual processor and first machine-readable instructions. The first machine-readable instructions include a first predefined software bug. The method includes executing, using the virtual processor, the first machine-readable instructions. Executing the first machine-readable instructions includes generating, using the virtual processor, a first input indicating an identification of the first predefined software bug of the first machine-readable instructions. Executing the first machine-readable instructions includes transmitting, using the virtual processor, a first signal associated with the first input to the administrative computing system, wherein the first signal causes the administrative computing system to generate a score associated with the first client computing system in response to verification by the administrative computing system in response to verification by the administrative computing system.

In yet another aspect, a method includes transmitting, using an administrative computing system, a first instance to a first client computing system, wherein the first instance includes a first partition of computing resources of the administrative computing system. The first partition of computing resources includes a first virtual processor and first machine-readable instructions. The first machine-readable instructions include a first predefined software bug. The method includes receiving, using the administrative computing system, a first signal associated with a first input received by the first client computing system, wherein the first input indicates an identification of the first predefined software bug of the first machine-readable instructions. The method includes verifying, using the administrative computing system, the first signal. The method includes increasing, using the administrative computing system, a first score associated with the first client computing system in response to verification of the first signal.

In yet another aspect a system includes one or more processors and one or more nontransitory computer-readable mediums storing machine-readable instructions that, when executed, cause the one or more processors to receive an instance from an administrative computing system. The instance includes a partition of computing resources of the administrative computing system. The partition of computing resources includes a virtual processor and first set of machine-readable instructions. The first set of machine-readable instructions includes a first predefined software bug. Executing the machine-readable instructions causes the one or more processors to execute the first set of machine-readable instructions. Executing the first set of machine-readable instructions causes the one or more processors to receive first input indicating an identification of the first predefined software bug of the first set of machine-readable instructions. Executing the first set of machine-readable instructions causes the one or more processors to transmit a first signal associated with the first input to the administrative computing system, wherein the first signal causes the administrative computing system to generate a score associated with the first client computing system.

In yet another aspect, a machine learning system includes one or more processors and one or more nontransitory computer-readable mediums storing machine-readable instructions that, when executed, cause the one or more processors to receive an instance from an administrative computing system. The instance includes a partition of computing resources of the administrative computing system. The partition of computing resources includes a virtual processor and first set of machine-readable instructions. The first set of machine-readable instructions includes a first predefined software bug. Executing the machine-readable instructions causes the one or more processors to execute the first set of machine-readable instructions. Executing the first set of machine-readable instructions causes the one or more processors to receive first input indicating an identification of the first predefined software bug of the first set of machine-readable instructions. Executing the first set of machine-readable instructions causes the one or more processors to transmit a first signal associated with the first input to the administrative computing system, wherein the first signal causes the administrative computing system to generate a score associated with the first client computing system.

In yet another aspect, a method includes receiving, using a first client computing system, an instance from an administrative computing system. The instance includes a partition of computing resources of the administrative computing system. The partition of computing resources includes a virtual processor and first set of machine-readable instructions. The first set of machine-readable instructions includes a first predefined software bug. The partition of computing resources includes second set of machine-readable instructions. The second set of machine-readable instructions includes a second predefined software bug. The second set of machine-readable instructions are associated with a second client computing system communicatively coupled to the first client computing system and the administrative computing system. The method includes executing, using the virtual processor, the first set of machine-readable instructions, wherein executing the first set of machine-readable instructions includes receiving, using the virtual processor, a first input indicating an identification of the first predefined software bug of the first set of machine-readable instructions. Executing the first set of machine-readable instructions includes transmitting, using the virtual processor, a first signal associated with the first input to the administrative computing system, wherein the first signal causes the administrative computing system to generate a score associated with the first client computing system. Executing the first set of machine-readable instructions includes receiving, using the virtual processor, a second input indicating an identification of the second predefined software bug of the second set of machine-readable instructions. Executing the first set of machine-readable instructions includes transmitting, using the virtual processor, a second signal associated with the second input to the administrative computing system, wherein the second signal causes the administrative computing system to increase the score associated with the first client computing system. The method includes displaying, using the first client computing system, a user interface. The user interface includes a first user interface element that causes the virtual processor to receive the first input in response to selection of the first user interface element. The user interface includes a second user interface element that causes the virtual processor to receive the second input in response to selection of the second user interface element. The user interface includes a text user interface element. The method includes displaying, using the first client computing system, binary file within the text user interface element, the binary file representing one of a set of the first set of machine-readable instructions and a set of the second set of machine-readable instructions.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

FIG. 3B schematically depicts an illustrative user interface of an administrative computing system of the software bug detection system according to one or more embodiments shown and described herein;

DETAILED DESCRIPTION

Figure 1:
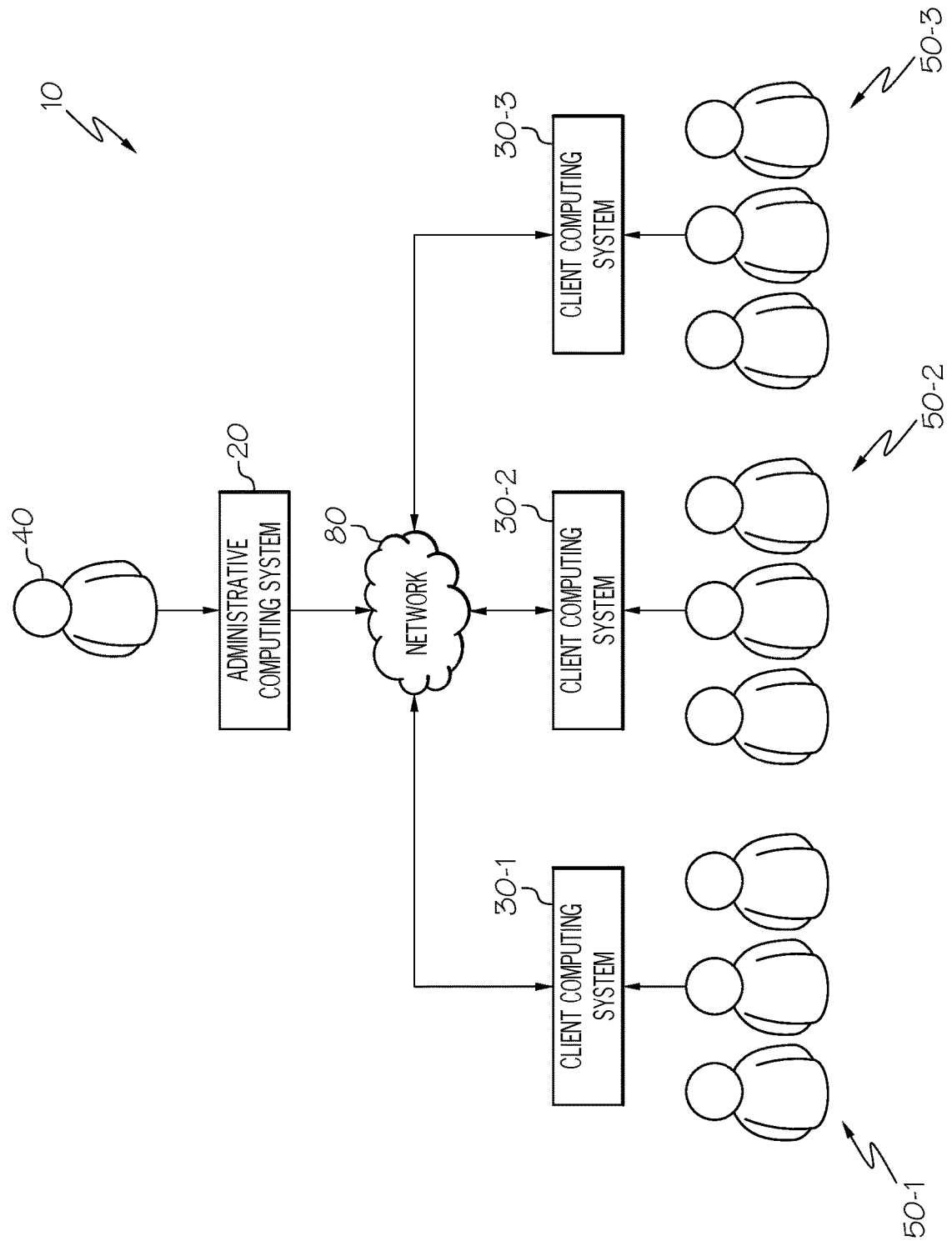
FIG. 1 schematically depicts an illustrative software bug detection system according to one or more embodiments shown and described herein.

Referring to the figures, embodiments of the present disclosure are generally directed to devices, systems, and methods for training a user or a computer system to identify predefined software bugs using a plurality of client computing systems. In embodiments, an administrative computing system is communicatively coupled to the plurality of client computing systems, and the administrative computing system deploys virtual computing resources to each of the client computing systems. The virtual computing resources may each include machine-readable instructions that are executable by a virtual processor, and each of the machine-readable instructions may include one or more software bugs that are defined by an administrator of the administrative computing system prior to deployment.

During a simulation session, users of each of the client computing systems (or the client computing system itself in embodiments where the client computing system is being trained) may evaluate their respective deployed machine-readable instructions, locate and correct the predefined software bugs, and submit the corrected predefined software bugs for verification. In response to the administrative computing system verifying that the users of the corresponding client computing system have properly corrected the predefined software bug, the administrative computing system increases a score associated with the corresponding client computing system.

Likewise, the users of each of the client computing systems (or the client computing system itself in embodiments where the client computing system is being trained) may evaluate machine-readable instructions deployed to other client computing systems, locate and exploit the predefined software bugs of other client computing systems, and submit the exploited predefined software bugs for verification. In response to the administrative computing system verifying that the users of the corresponding client computing system have properly exploited the predefined software bug, the administrative computing system increases a score associated with the corresponding client computing system.

Upon completion of the simulation session, the administrative computing system may generate and report a score for each client computing system of the plurality of computing systems. Subsequently, the administrative computing system may rank and generate a report indicating the ranking of each client computing system of the client computing systems.

Accordingly, the software bug detection system enables users and/or systems to improve their ability to identify and correct various computing system and network issues that may arise due to malicious third party actions, such as memory corruption issues, memory vulnerability issues, memory disclosure issues, information leakage issues, logic vulnerability issues, cryptographic issues, and/or the like.

As used herein, the term "software bug" refers to an error, flaw, fault, and/or vulnerability that is associated with at least one of an application service and a network of a computing system. As used herein, the term "predefined software bug" refers to an error, flaw, fault, and/or vulnerability that is selected from a list of errors, flaws, faults, and/or vulnerabilities associated with at least one of an application service and a network of a computing system.

Now referring to FIG. 1, a software bug detection system 10 is schematically illustrated. In embodiments, the software bug detection system 10 includes an administrative computing system 20, a first client computing system 30-1, a second client computing system 30-2, a third client computing system 30-3 (collectively referred to as client computing systems 30). While three client computing systems 30 are illustrated, it should be understood that the software bug detection system 10 may include any number of client computing systems 30 in other embodiments. The client computing systems 30 and the administrative computing system may be communicatively coupled via network 80.

As shown in FIG. 1, the administrative computing system 20 may be operated and controlled by an administrator 40. Furthermore, the first client computing system 30-1 may be operated and controlled by users 50-1, the second client computing system 30-2 may be operated and controlled by users 50-2, and the third client computing system 30-3 may be operated and controlled by users 50-3. While the software bug detection system 10 illustrates the client computing systems 30 being operated and controlled by the users 50-1, 50-2, 50-3 (collectively referred to as users 50), it should be understood that the operation and control of the client computing systems 30 may be partially or entirely executed by the client computing systems 30 without any interaction with a user. As a non-limiting example, the client computing systems 30 may be artificial intelligence (AI) computing systems that execute the functionality described herein using one or more machine-learning and/or one or more deep-learning algorithms and without input from the users 50.

In embodiments, the administrator 40 deploys, using the administrative computing system 20, virtual computing resources to each of the client computing systems 30. The virtual computing resources may each include machine-readable instructions that are executable by a virtual processor, and each of the machine-readable instructions may include one or more software bugs that are defined by the administrator 40 or the administrative computing system 20 prior to deployment, as described below in further detail.

In various embodiments, the administrator 40 may define various parameters of a simulation session and the virtual computing resources deployed to each of the client computing systems 30 using the administrative computing system 20. As a non-limiting example and as described below in further detail with reference to FIGS. 3A-3B, the administrator 40 may assign each of the users 50 to a particular client computing system 30, define software bugs to include within the machine-readable instructions deployed to each of the client computing systems 30, and define a length of the simulation session.

Once the parameters of the simulation session are defined, the administrator 40 may deploy the virtual computing resources to the client computing systems 30 using the administrative computing system 20. As described below in further detail with reference to FIG. 4A, during the simulation session, the users 50 of each of the client computing systems 30 (or the client computing systems 30 without any user interaction) may evaluate their respective deployed machine-readable instructions, locate and correct the predefined software bugs, and submit the corrected predefined software bugs to the administrative computing system 20 for verification. In response to the administrative computing system 20 verifying that the users 50 of the corresponding client computing system 30 (or the respective client computing system 30 without any user interaction) have properly corrected the predefined software bug, the administrative computing system 20 increases a score associated with the corresponding client computing systems 30.

Furthermore and as described below in further detail with reference to FIG. 4B, during the simulation session, the users 50 of each of the client computing systems 30 may evaluate machine-readable instructions deployed to other client computing systems 30, locate and exploit the predefined software bugs of the other client computing systems 30, and submit the exploited predefined software bugs to the administrative computing system 20 for verification. In response to the administrative computing system 20 verifying that the users of the corresponding client computing system 30 have properly exploited the predefined software bug, the administrative computing system 20 increases a score associated with the corresponding client computing systems. It should be understood that the one or more software bugs that are deployed to each of the client computing systems 30 may be rotated after a predefined period of time during the simulation session.

Upon completion of the simulation session, the administrative computing system 20 may generate and report a score for each of the client computing systems 30, as described below in further detail with reference to FIG. 4C.

Figure 2A:
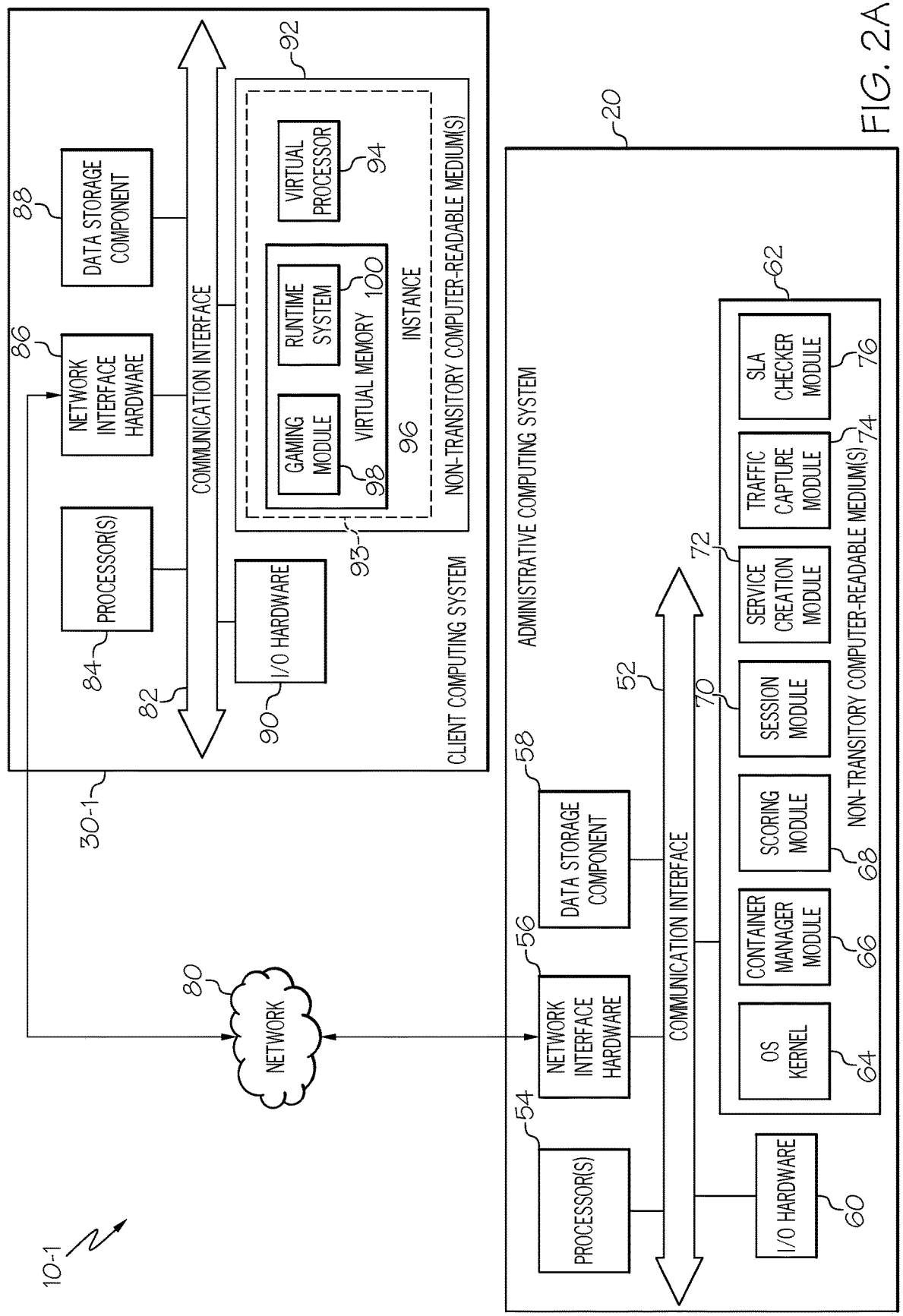
FIG. 2A schematically depicts a functional block diagram of illustrative modules and components contained within an example software bug detection system according to one or more embodiments shown and described herein.

With reference to FIG. 2A, a functional block diagram of illustrative modules and components contained within a software bug detection system 10-1 are schematically depicted. As shown in FIG. 2A, the administrative computing system 20 generally includes a communication interface 52, one or more processors 54, network interface hardware 56, a data storage component 58, input/output hardware 60, and one or more non-transitory computer-readable mediums 62. The one or more non-transitory computer-readable mediums 62 include an operating system kernel 64, a container manager module 66, a scoring module 68, a session module 70, a service creation module 72, a traffic capture module 74, and a service level agreement checker module 76. The components of the administrative computing system 20 may be physically and/or communicatively coupled through the communication interface 52.

The communication interface 52 is formed from any medium that transmits a signal. As non-limiting examples, the communication interface 52 is formed of conductive wires, conductive traces, optical waveguides, or the like. The communication interface 52 may also refer to the expanse in which electromagnetic radiation and their corresponding electromagnetic waves are propagated. Moreover, the communication interface 52 may be formed from a combination of mediums that transmit signals. In one embodiment, the communication interface 52 includes a combination of conductive traces, conductive wires, connectors, and buses that cooperate to permit the transmission of electrical data signals to and from the various components of the administrative computing system 20. Additionally, it is noted that the term "signal" means a waveform (e.g., electrical, optical, magnetic, mechanical or electromagnetic) that travels through a medium, such as DC, AC, sinusoidal-wave, triangular-wave, square-wave, vibration, and the like.

The one or more processors 54, each of which may be a computer processing unit (CPU), may receive and execute machine-readable instructions stored in the one or more non-transitory computer-readable mediums 62. As a non-limiting example, the one or more processors 54 may be one of a shared processor circuit, dedicated processor circuit, or group processor circuit. As described herein, the term "shared processor circuit" refers to a single processor circuit that executes some or all machine-readable instructions from the multiple modules. As described herein, the term "group processor circuit" refers to a processor circuit that, in combination with additional processor circuits, executes some or all machine-executable instructions from the multiple modules of one or more non-transitory computer-readable mediums. References to multiple processor circuits encompass multiple processor circuits on discrete dies, multiple processor circuits on a single die, multiple cores of a single processor circuit, multiple threads of a single processor circuit, or a combination of the above.

The input/output hardware 60 may include a basic input/output system (BIOS) that interacts with hardware of the administrative computing system 20, device drivers that interact with particular devices of the administrative computing system 20, one or more operating systems, user applications, background services, background applications, etc. The network interface hardware 56 may include and/or communicate with any wired or wireless networking hardware via the network 80, including an antenna, a modem, a LAN port, a wireless fidelity (Wi-Fi) card, a WiMax card, a long term evolution (LTE) card, a ZigBee card, a Bluetooth chip, a USB card, mobile communications hardware, and/or other hardware for communicating with other networks and/or devices. The data storage component 58 is communicatively coupled to the one or more processors 54. As a non-limiting example, the data storage component 58 may include one or more database servers that support NoSQL, MySQL, Oracle, SQL Server, NewSQL, or the like.

The one or more non-transitory computer-readable mediums 62 are communicatively coupled to the one or more processors 54. As a non-limiting example, the one or more non-transitory computer-readable mediums 62 may be one of a shared memory circuit, dedicated memory circuit, or group memory circuit. As described herein, the term "shared memory circuit" refers to a single memory circuit that stores some or all machine-readable instructions from multiple modules, which are described below in further detail. As described herein, the term "group memory circuit" refers to a memory circuit that, in combination with additional memories, stores some or all machine-readable instructions from the multiple modules. Non-limiting examples of the one or more non-transitory computer-readable mediums 62 include random access memory (including SRAM, DRAM, and/or other types of random access memory), read-only memory (ROM), flash memory, registers, compact discs (CD), digital versatile discs (DVD), and/or other types of storage components.

As shown in FIG. 2A, the first client computing system 30-1 includes a communication interface 82, one or more processors 84, network interface hardware 86, a data storage component 88, input/output hardware 90, and one or more non-transitory computer-readable mediums 92. The one or more non-transitory computer-readable mediums 92 include an instance 93 that is received from the administrative computing system 20. The instance 93 includes a partition of computing resources of the administrative computing system 20. The partition of the instance 93 includes a virtual processor 94 and a virtual memory 96, which includes a gaming module 98 and a runtime system 100. The components of the client computing system 30-1 may be physically and/or communicatively coupled through the communication interface 82. While the embodiment illustrated in FIG. 2A depicts the first client computing system 30-1, it should be understood that each of the client computing systems 30 includes the communication interface 82, the one or more processors 84, the network interface hardware 86, the data storage component 88, the input/output hardware 90, and the one or more non-transitory computer-readable mediums 92.

The communication interface 82 is formed from any medium that transmits a signal. As non-limiting examples, the communication interface 82 is formed of conductive wires, conductive traces, optical waveguides, or the like. The communication interface 82 may also refer to the expanse in which electromagnetic radiation and their corresponding electromagnetic waves are propagated. Moreover, the communication interface 82 may be formed from a combination of mediums that transmit signals. In one embodiment, the communication interface 82 includes a combination of conductive traces, conductive wires, connectors, and buses that cooperate to permit the transmission of electrical data signals to and from the various components of the first client computing system 30-1.

The one or more processors 84, each of which may be a computer processing unit (CPU), may receive and execute machine-readable instructions stored in the one or more non-transitory computer-readable mediums 92. As a non-limiting example, the one or more processors 84 may be one of a shared processor circuit, dedicated processor circuit, or group processor circuit.

The input/output hardware 90 may include a basic input/output system (BIOS) that interacts with hardware of the first client computing system 30-1, device drivers that interact with particular devices of the first client computing system 30-1, one or more operating systems, user applications, background services, background applications, etc. The network interface hardware 86 may include and/or communicate with any wired or wireless networking hardware via the network 80, including an antenna, a modem, a LAN port, a wireless fidelity (Wi-Fi) card, a WiMax card, a long term evolution (LTE) card, a ZigBee card, a Bluetooth chip, a USB card, mobile communications hardware, and/or other hardware for communicating with other networks and/or devices. The data storage component 88 is communicatively coupled to the one or more processors 84. As a non-limiting example, the data storage component 88 may include one or more database servers that support NoSQL, MySQL, Oracle, SQL Server, NewSQL, or the like.

The one or more non-transitory computer-readable mediums 92 are communicatively coupled to the one or more processors 84. As a non-limiting example, the one or more non-transitory computer-readable mediums 92 may be one of a shared memory circuit, dedicated memory circuit, or group memory circuit. Non-limiting examples of the one or more non-transitory computer-readable mediums 92 include random access memory (including SRAM, DRAM, and/or other types of random access memory), read-only memory (ROM), flash memory, registers, compact discs (CD), digital versatile discs (DVD), and/or other types of storage components.

A description of the various modules of the administrative computing system 20 and the first client computing system 30-1 will now be provided with reference to FIG. 2A. As described herein, the term module may refer to, be part of, or include: an Application Specific Integrated Circuit (ASIC); a digital, analog, or mixed analog/digital discrete or integrated circuit; a combinational logic circuit; a field programmable gate array (FPGA); a memory circuit that stores machine-readable instructions executed by the processor circuit; other suitable hardware components that provide the described functionality; or a combination of some or all of the above.

The container manager module 66 defines and deploys the instance 93, which is a container in the software bug detection system 10-1, to the first client computing system 30-1. As defined herein, the phrase "container" refers to a software package that includes machine-readable instructions and all its dependencies such that the corresponding modules of the respective client computing systems 30 are executable using the computing resources of the administrative computing system 20 and are executable in isolation. The container manager module 66 deploys the machine-readable instructions and respective dependencies of the instance 93 to each of the client computing systems 30, and each of the client computing systems 30 may share the operating system kernel 64.

The scoring module 68 generates a score for each of the client computing systems 30 while and/or after the execution of the simulation session. Further details regarding the scoring module 68 are described below in further detail with reference to FIGS. 4A-4C, for example. The session module 70 enables the administrator 40 to define certain parameters of the simulation session. Further details regarding the session module 70 are described below with reference to FIGS. 3A-3B.

The service creation module 72 enables the administrator 40 to define the software bugs for an application service of each of the client computing systems 30. The traffic capture module 74 enables the administrator 40 to define the software bugs of the network traffic of each of the client computing systems 30. Further details regarding the service creation module 72 and the traffic capture module 74 are described below in further detail with reference to FIGS. 3A-3B, for example. The service level agreement checker module 76 determines an offline status of each of the client computing systems 30 during the simulation session. Further details regarding the service level agreement checker module 76 are described below in further detail with reference to FIGS. 4A-4B, for example.

As described above, the instance 93 is deployed to the first client computing system 30-1 as a container. The machine-readable instructions of the instance 93 include the virtual processor 94, the virtual memory 96, the gaming module 98, and the runtime system 100.

The virtual memory 96 includes the underlying operating system that provides the basic services for the gaming module 98 and the runtime system 100. The gaming module 98 includes the machine-readable instructions corresponding to the user interface of the client computing systems 30 that is generated during the simulation session, the application service, the network traffic service, and the software bugs as defined by the administrator 40 or the administrative computing system 20. The runtime system 100 provides the environment that enables the instance 93 deployed to the first client computing system 30-1 to be executed in isolation with respect to, for example, the second client computing system 30-2 and the third client computing system 30-3.

Figure 2B:
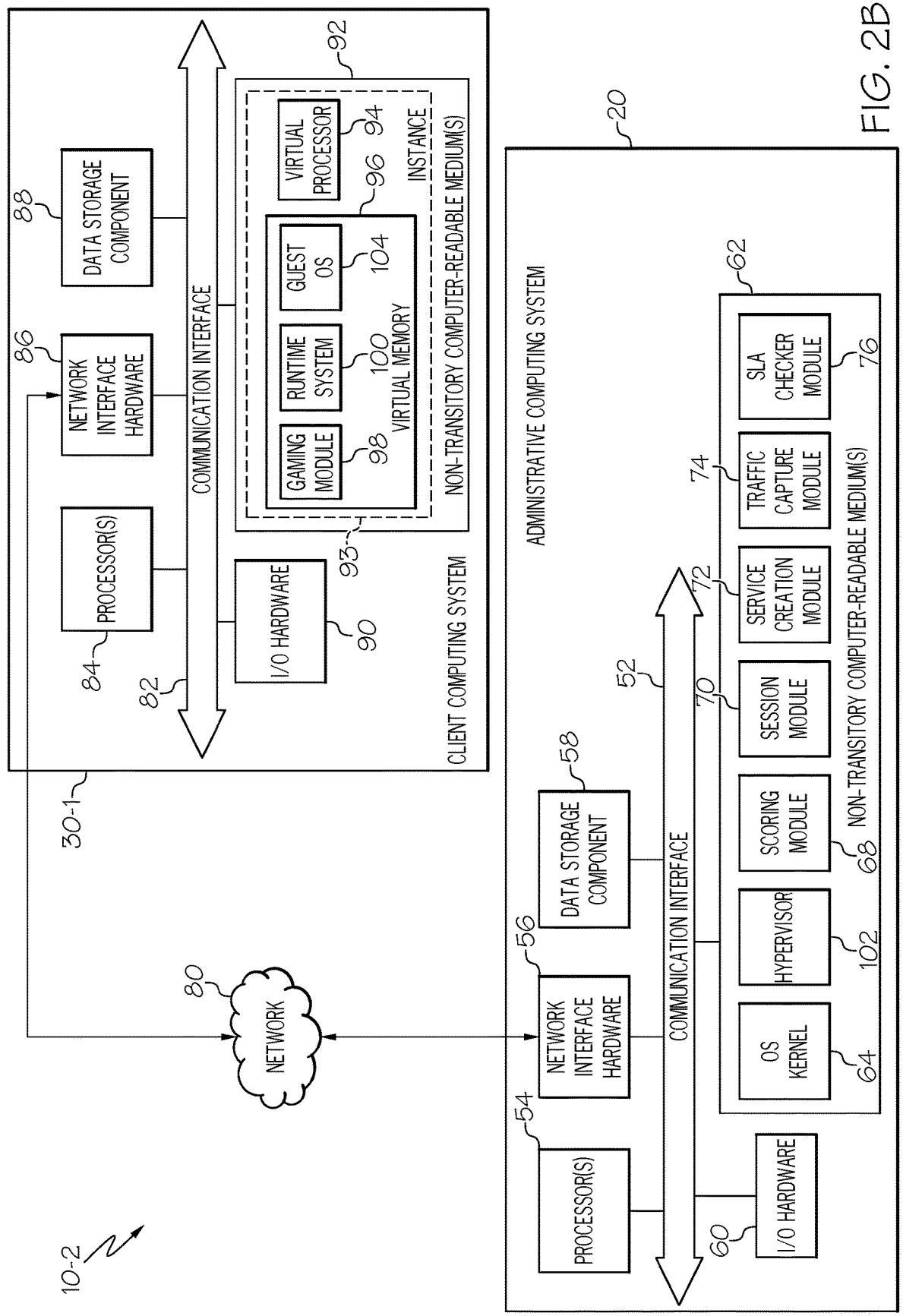
FIG. 2B schematically depicts a functional block diagram of illustrative modules and components contained within another example software bug detection system according to one or more embodiments shown and described herein.

With reference to FIG. 2B, another example functional block diagram of illustrative modules and components contained within software bug detection system 10-2 are schematically depicted. Software bug detection system 10-2 is similar to the software bug detection system 10-1 illustrated in FIG. 2A, but in this embodiment, the instance 93 is deployed as a virtual machine. As used herein, the phrase "virtual machine" refers to a software package that includes machine-readable instructions and all its dependencies such that the instance 93 is an emulation of the administrative computing system 20. Each virtual machine may include its own guest operating system 104 (e.g., each virtual machine may include its own operating system), and the hardware of the virtual machine may be virtualized. Accordingly, the hypervisor 102 of the virtual machine may include machine-readable instructions corresponding to the user interface of the client computing systems 30 during the simulation session, the application service, the network traffic service, and the software bugs as defined by the administrator 40 or the administrative computing system 20.

A description of the various modules of the administrative computing system 20 and the first client computing system 30-1 will now be provided with reference to FIG. 2B.

The hypervisor 102 may include machine-readable instructions corresponding to the user interface of the client computing systems 30 during the simulation session, the application service, the network traffic service, and the software bugs as defined by the administrator 40 or the administrative computing system 20.

The scoring module 68 generates a score for each of the client computing systems 30 while and/or after the execution of the simulation session. Further details regarding the scoring module 68 are described below in further detail with reference to FIGS. 4A-4C, for example. The session module 70 enables the administrator 40 to define certain parameters of the simulation session. Further details regarding the session module 70 are described below with reference to FIGS. 3A-3B.

The service creation module 72 enables the administrator 40 to define the software bugs for an application service of each of the client computing systems 30. The traffic capture module 74 enables the administrator 40 to define the software bugs of the network traffic of each of the client computing systems 30. Further details regarding the service creation module 72 and the traffic capture module 74 are described below in further detail with reference to FIGS. 3A-3B, for example. The service level agreement checker module 76 determines an offline status of each of the client computing systems 30 during the simulation session. Further details regarding the service level agreement checker module 76 are described below in further detail with reference to FIGS. 4A-4B, for example.

The instance 93 is deployed to the first client computing system 30-1 as a virtual machine. The machine-readable instructions of the instance 93 include the virtual processor 94, the virtual memory 96, the gaming module 98, the runtime system 100, and the guest operating system 104.

The virtual memory 96 includes the underlying operating system that provides the basic services for the gaming module 98 and the runtime system 100. The gaming module 98 includes the machine-readable instructions corresponding to the user interface of the client computing systems 30 that is generated during the simulation session, the application service, the network traffic service, and the software bugs as defined by the administrator 40 or the administrative computing system 20. The runtime system 100 provides the environment that enables the instance 93 deployed to the first client computing system 30-1 to be executed in isolation with respect to, for example, the second client computing system 30-2 and the third client computing system 30-3.

While the embodiments above described with reference to FIGS. 2A-2B illustrate that the first client computing system 30-1 is controlled and operated by the users 50-1, it should be understood that some of the functions described in FIGS. 2A-2B that require an input or action from the users 50-1 may be executed solely by the client computing systems 30. As a non-limiting example, the first client computing system 30-1 may be an AI computing system that executes the functionality described above using machine-learning and/or deep-learning algorithms and without input from the users 50-1).

Figure 3A:
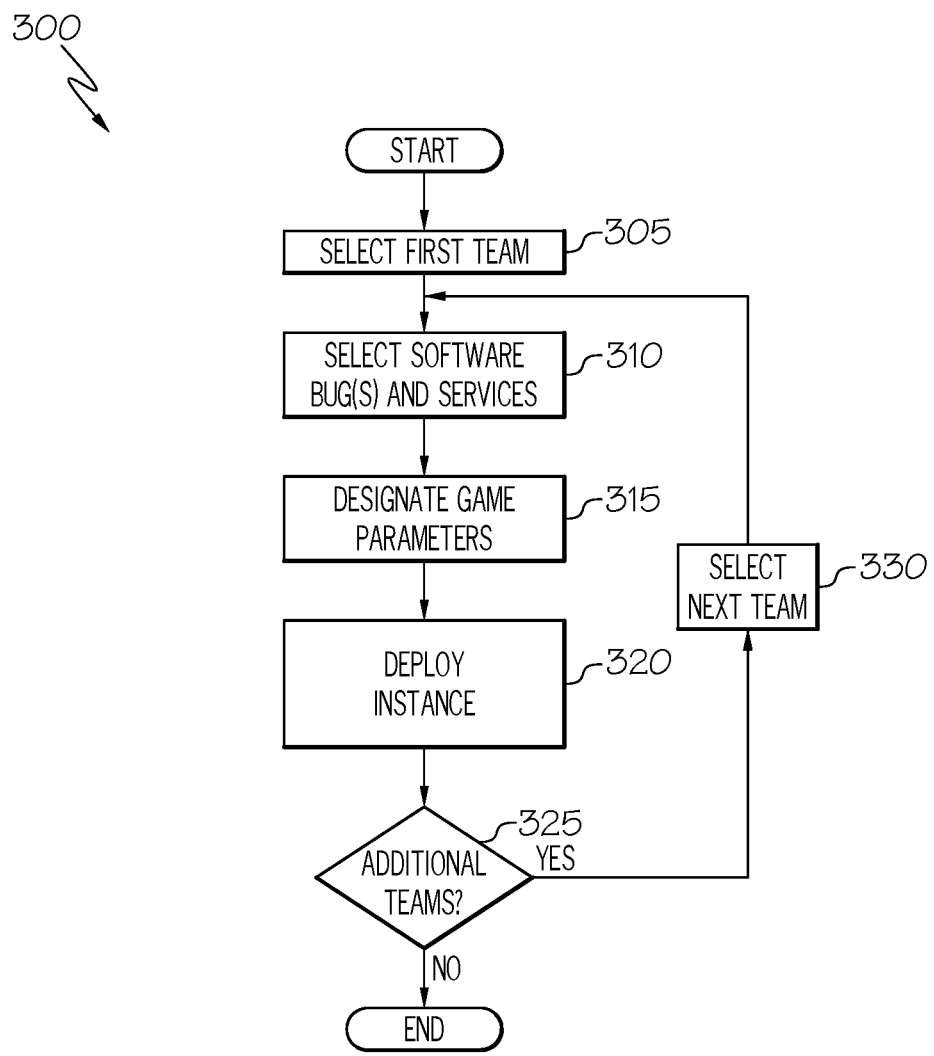
FIG. 3A depicts a flow diagram of an illustrative method of deploying a plurality of containers of the software bug detection system according to one or more embodiments shown and described herein.

With reference to FIG. 3A, a flow diagram of an illustrative method 300 of deploying a plurality of instances 93 of the software bug detection system 10 is depicted. While the blocks shown in FIG. 3A are shown as all-occurring and in a particular order, in other embodiments, one or more of the blocks may not be performed, and in some embodiments, one or more of the blocks may be performed in a different order as shown and described herein. In some embodiments, additional blocks not described herein may also be performed. Furthermore, while certain blocks shown in FIG. 3A are described as being executed by the administrator 40 using the administrative computing system 20, it should be understood that some or all of the functions described in the blocks of FIG. 3A may be executed solely by the administrative computing system 20 (e.g., the administrative computing system 20 may be an AI computing system that executes the functionality described in FIG. 3A using machine-learning and/or deep-learning algorithms and without input from the administrator 40).

Referring to FIGS. 1, 2A-2B, and 3A, the administrator 40 selects a first team from the users 50 using the service creation module 72 of the administrative computing system 20 at block 305 (e.g., the users 50-1 associated with the first client computing system 30-1).

Still referring to FIGS. 1, 2A-2B, and 3A, at block 310, the administrator 40 selects, using the service creation module 72 of the administrative computing system 20, a predefined software bug and service to deploy to the client computing systems 30. In some embodiments, the predefined software bug may be selected from the common weakness enumeration (CWE) list of software weaknesses and/or bugs. As a non-limiting example and as illustrated in FIG. 3B, which illustrates an example user interface 340 generated and displayed by the administrative computing system 20, the administrator 40 may select the software bugs as CWE-121 (e.g., stack-based buffer overflow), CWE-23 (e.g., relative path), CWE-287 (e.g., improper authentication), and CWE-676 (e.g., potential use of dangerous function) by selecting at least one of user interface element 345 and user interface element 355. It should be understood that any software bugs and/or weaknesses of the CWE list may be selected by the administrator 40 in other embodiments. It should also be understood that the predefined software bug may be selected from any other list of predefined software bugs in other embodiments. It should be understood that each time a software bug is compiled using the service creation module 72, a new and/or random memory location is selected to ensure reuse/replicability of the simulation session.

Furthermore, at block 310, the administrator 40 may select an application service and/or network service associated with the predefined software bug. As a non-limiting example and as illustrated in FIG. 3B, the administrator 40 may select a messenger application service by selecting user interface element 350. It should be understood that the administrator 40 may select an emailing application service, an internet application service, and/or a custom application service in other embodiments.

Still referring to FIGS. 1, 2A-2B, and 3A, at block 315, the administrator 40 designates, using the session module 70 of the administrative computing system 20, the parameters of the simulation session. In some embodiments and as illustrated in FIG. 3B, the administrator 40 may designate a session length (e.g., 120 hours), a round length (e.g., 2 minutes), and/or other parameters of the simulation session by inputting the corresponding values into user interface elements 360. Referring to FIGS. 1, 2A-2B, and 3A, at block 320, the administrator 40 deploys, using the container manager module 66 of the administrative computing system 20, the instance 93 to the corresponding client computing system 30 by selecting one of the user interface elements 360.

Referring to FIGS. 1, 2A-2B, and 3A, at block 325, the administrative computing system 20 determines whether additional teams are included within the software bug detection system 10. As used herein, the term "team" refers to an individual, a group of individuals, an AI computing system, or a group of AI computing systems. If so, the method 300 proceeds to block 330. At block 330 and with reference to FIGS. 1, 2A-2B, and 3A, the administrative computing system 20 selects the next team and proceeds to block 310. If the administrative computing system 20 determines no additional teams are included within the software bug detection system 10 at block 325, the method 300 ends.

Figure 4A:
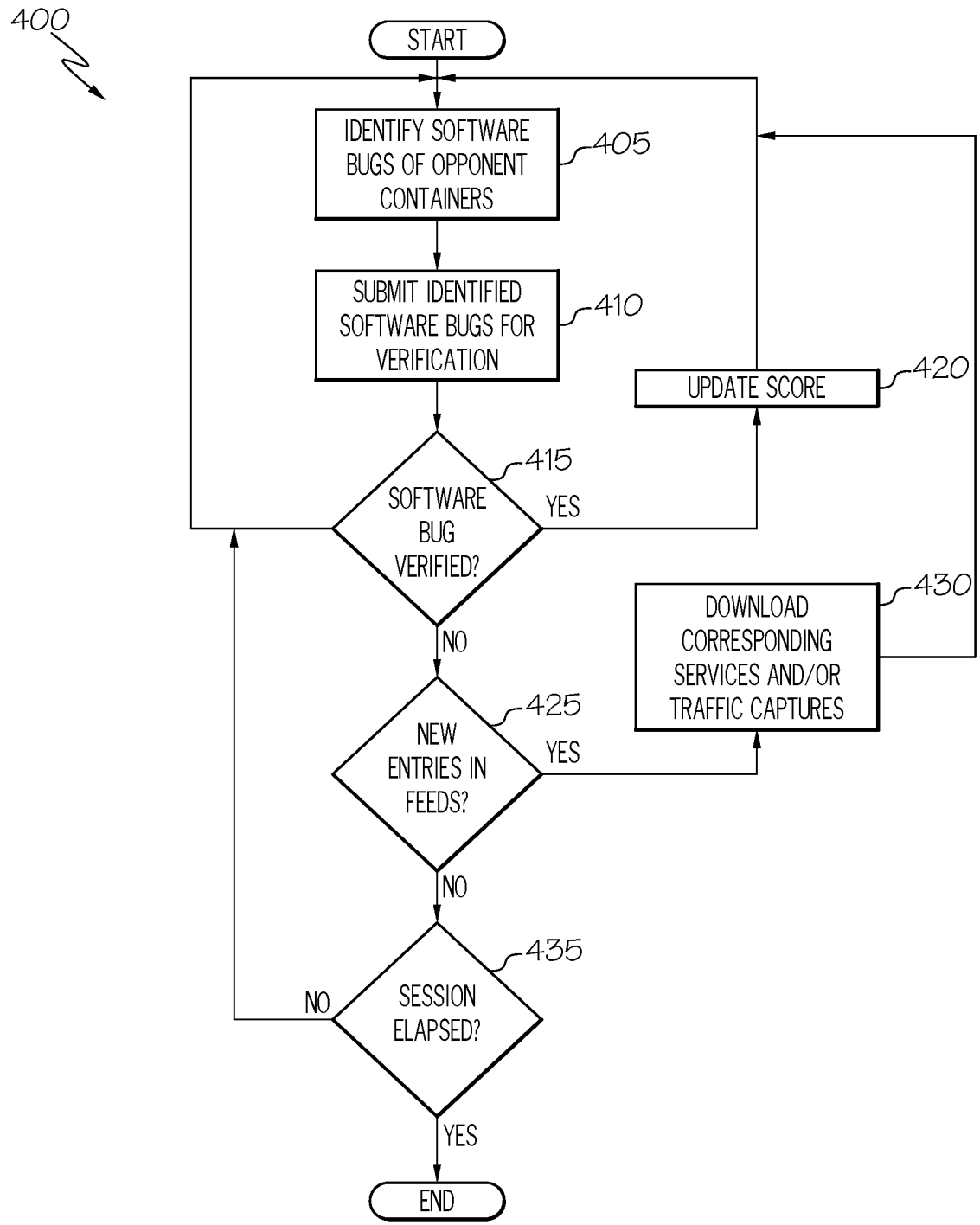
FIG. 4A depicts a flow diagram of an illustrative method of identifying a software bug of an instance of the software bug detection system according to one or more embodiments shown and described herein.

With reference to FIG. 4A, a flow diagram of an illustrative method 400 of identifying a software bug of an instance 93 deployed to the respective client computing system 30 during a simulation session of the software bug detection system 10 is depicted. While the blocks shown in FIG. 4A are shown as all-occurring and in a particular order, in other embodiments, one or more of the blocks may not be performed, and in some embodiments, one or more of the blocks may be performed in a different order as shown and described herein. In some embodiments, additional blocks not described herein may be performed. Furthermore, while certain blocks shown in FIG. 4A are described as being executed by the users 50 of the client computing systems 30, it should be understood that some or all of the functions described in the blocks of FIG. 4A may be executed solely by the client computing systems 30 (e.g., the client computing systems 30 may be AI computing systems that execute the functionality described in FIG. 4A using machine-learning and/or deep-learning algorithms and without input from the users 50).

Referring to FIGS. 1, 2A-2B, 4A, and 4D, at block 405, the users 50-1 of the first client computing system 30-1 identify, using the gaming module 98 of the instance 93, the predefined software bugs of opponent containers (or virtual machines) of other client computing systems 30 (e.g., the instances 93 deployed to the second client computing system 30-2 and the third client computing system 30-3).

Figure 4B:
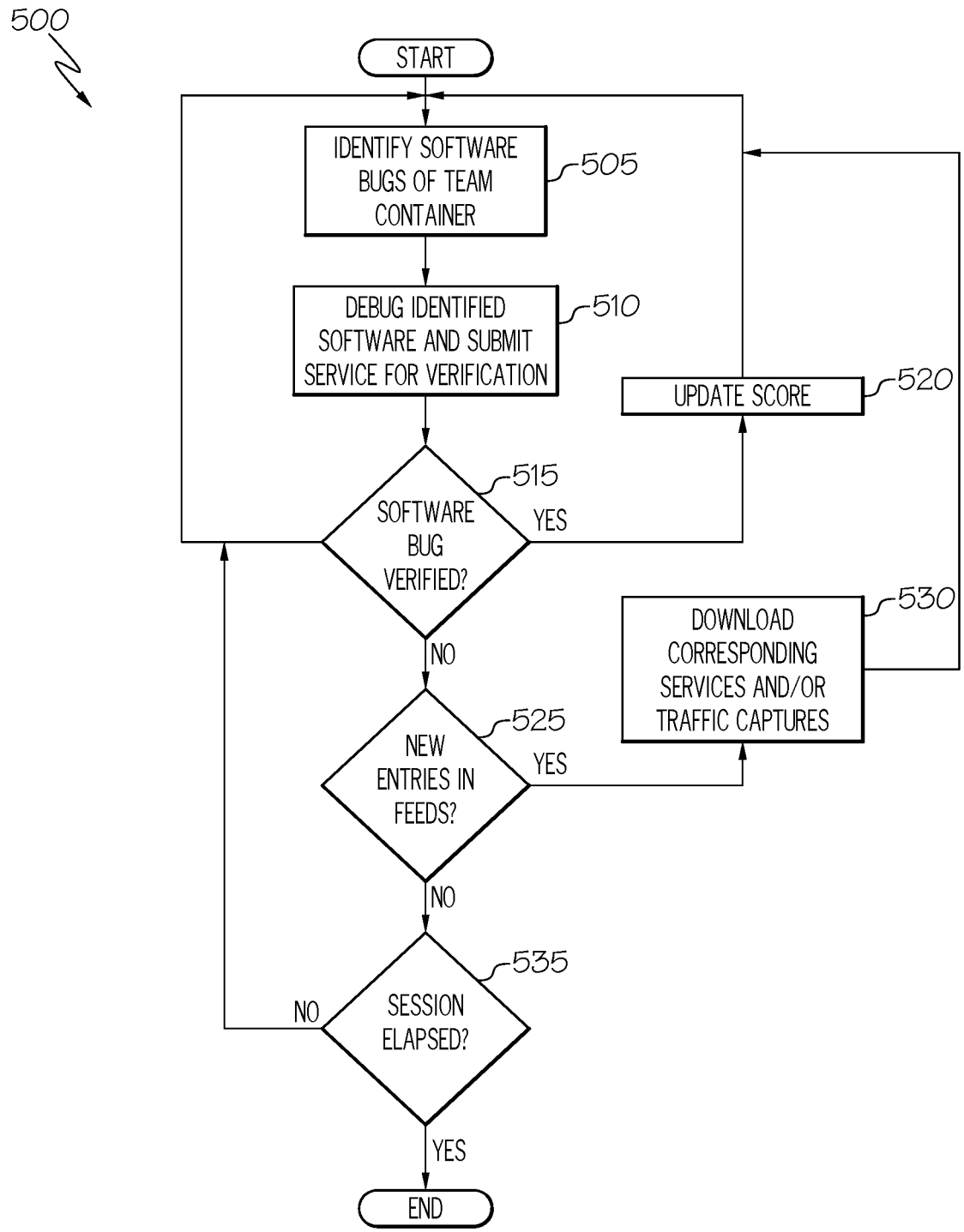
FIG. 4B depicts a flow diagram of an illustrative method of identifying a software bug of an instance of the software bug detection system according to one or more embodiments shown and described herein.
Figure 4C:
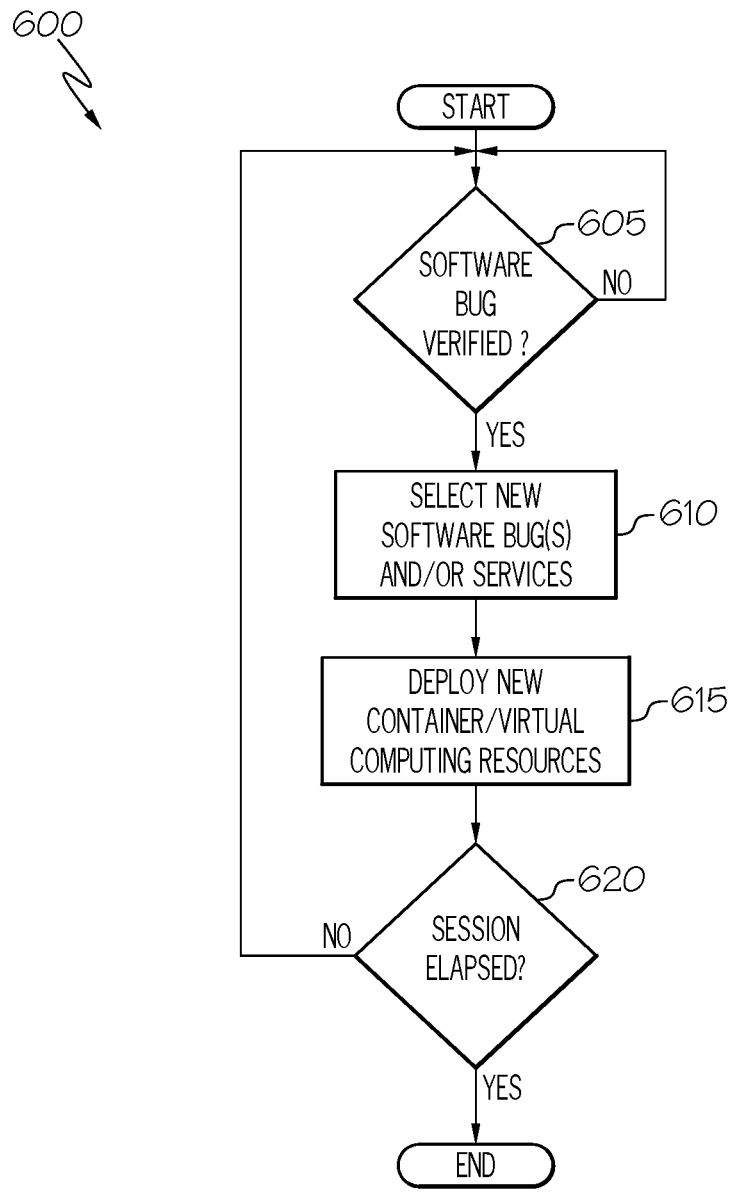
FIG. 4C depicts a flow diagram of an illustrative method of an administrative computing system dynamically deploying software bugs to the client computing systems during a simulation session of the software bug detection system according to one or more embodiments shown and described herein.
Figure 4D:
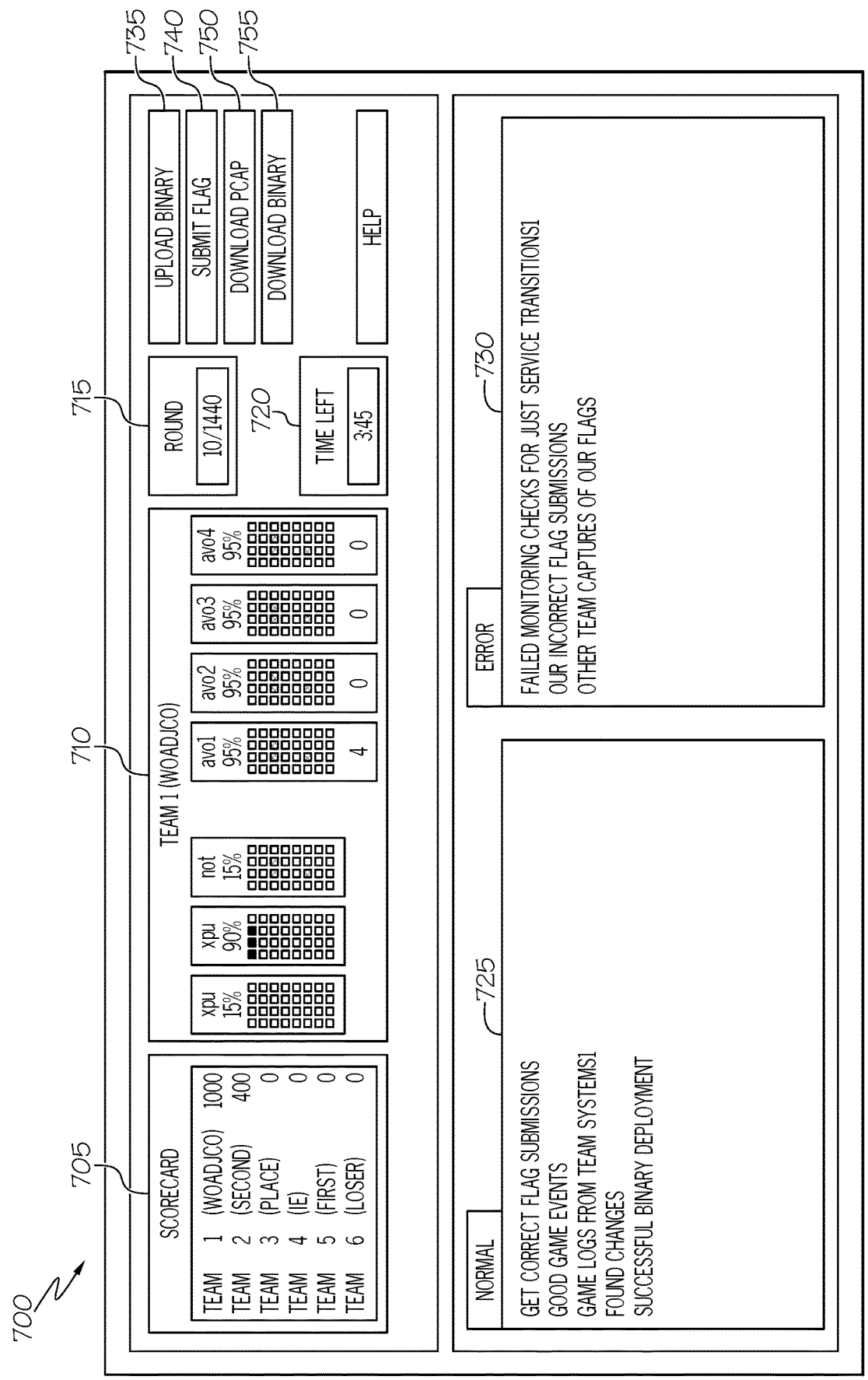
FIG. 4D schematically depicts an illustrative user interface of a client computing system of the software bug detection system according to one or more embodiments shown and described herein.

In some embodiments and as illustrated in FIG. 4D, when the simulation session begins, executing the instance 93 of causes each client computing system 30 to generate a user interface 700. The user interface 700 includes a scorecard portion 705 indicating a score of each of the client computing systems 30, a team health portion 710 indicating various metrics associated with the computing resources deployed to the first client computing system 30-1, and round information 715 indicating a progress value of the current simulation session. The user interface 700 includes time information 720 indicating a current value of a session timer, which is initiated in response to the administrative computing system 20 deploying the instances 93 to the client computing systems 30. In some embodiments, the session timer may be reset when a new simulation session is executed.

The user interface 700 also includes gaming information 725 indicating various events associated with the simulation session and error information 730 indicating various errors associated with the first client computing system 30-1. The user interface 700 also includes an upload binary user interface element 735 that causes the first client computing system 30-1 to upload a binary file associated with modified machine-readable instructions provided to the first client computing system 30-1 and a submit flag user interface element 740 that causes the first client computing system 30-1 to upload a binary file associated with modified machine-readable instructions provided to another client computing system 30. The user interface 700 also includes a download packet capture (PCAP) user interface element 750 that causes the first client computing system 30-1 to request and download a binary file associated with network traffic from the administrative computing system and a download binary user interface element 755 that causes the first client computing system 30-1 to request and download a binary file associated with an application service from the administrative computing system 20.

As a non-limiting example, the users 50-1 of the first client computing system 30-1 may identify the predefined software bugs of the other client computing systems 30 by selecting at least one of the download PCAP user interface element 750 and the download binary user interface element 755. In response to selection of one of the download PCAP user interface element 750 and the download binary user interface element 755, the user interface 700 may display a binary file associated with the predefined software bugs deployed to the other client computing systems 30. Subsequently, the users 50-1 of the first client computing system 30-1 may locate and exploit the predefined software bugs of the other client computing systems 30 by selectively modifying the binary files within a text user interface.

Referring to FIGS. 1, 2A-2B, 4A, and 4D, at block 410, the users 50-1 submit the exploited predefined software bugs for verification by selecting the upload binary user interface element 735.

Referring to FIGS. 1, 2A-2B, 4A, and 4D, at block 415, the administrator 40 or the administrative computing system 20 determines whether the exploited predefined software bugs identified by the users 50-1 are verified. As a non-limiting example, the administrator 40 or the administrative computing system 20 may determine whether the users 50-1 have properly identified and exploited the predefined software bug based on the software bugs deployed to the corresponding client computing systems 30. If so, the method 400 proceeds to block 420 and updates the score of the first client computing system 30-1; otherwise the method 400 proceeds to block 425.

Referring to FIGS. 1, 2A-2B, 4A, and 4D, at block 425, the instance 93 determines whether there are new entries in the feed (e.g., the instance 93 determines whether additional machine-readable instructions of other client computing systems 30 are available for download). If so, the method 400 proceeds to block 430, where the first client computing system 30-1 downloads the new application services and/or traffic captures and then proceeds to block 405. Otherwise, the method 400 proceeds to block 435.

Referring to FIGS. 1, 2A-2B, 4A, and 4D, at block 435, the instance 93 determines whether the simulation session has elapsed. In some embodiments, the simulation session elapsing may be indicated by a timer value displayed by the time information 720. If so, the method 400 ends; otherwise, the method 400 proceeds to block 405.

With reference to FIG. 4B, a flow diagram of an illustrative method 500 of identifying a software bug of an instance 93 deployed to another client computing system 30 during a simulation session of the software bug detection system 10 is depicted. While the blocks shown in FIG. 4B are shown as all-occurring and in a particular order, in other embodiments, one or more of the blocks may not be performed, and in some embodiments, one or more of the blocks may be performed in a different order as shown and described herein. Furthermore, while certain blocks shown in FIG. 4B are described as being executed by the users 50 of the client computing systems 30, it should be understood that some or all of the functions described in the blocks of FIG. 4B may be executed solely by the client computing systems 30 (e.g., the client computing systems 30 may be AI computing systems that execute the functionality described in FIG. 4B using machine-learning and/or deep-learning algorithms and without input from the users 50).

Referring to FIGS. 1, 2A-2B, 4B, and 4D, at block 505, the users 50-1 of the first client computing system 30-1 identify, using the gaming module 98 of the instance 93, the predefined software bugs of the container (or virtual machine) deployed to the first client computing system 30-1. As a non-limiting example, the users 50-1 of the first client computing system 30-1 may identify the predefined software bugs deployed to the first client computing system 30-1 by selecting at least one of the download PCAP user interface element 750 and the download binary user interface element 755. In response to selection of one of the download PCAP user interface element 750 and the download binary user interface element 755, the user interface 700 may display a binary file associated with the predefined software bugs deployed to the first client computing system 30-1.

Referring to FIGS. 1, 2A-2B, 4B, and 4D, at block 510, the users 50-1 debug the predefined software bugs deployed to the first client computing system 30-1. As a non-limiting example, the users 50-1 of the first client computing system 30-1 may locate and correct the predefined software bugs of the first client computing system 30-1 by selectively modifying the binary files within a text user interface. Furthermore, at block 510, the users 50-1 submit the debugged software bugs for verification by selecting the upload binary user interface element 735.

Referring to FIGS. 1, 2A-2B, 4B, and 4D, at block 515, the administrator 40 or the administrative computing system 20 determines whether the predefined software bugs identified and corrected by the users 50-1 are verified. As a non-limiting example, the administrator 40 or the administrative computing system 20 may determine whether the users 50-1 have properly identified and corrected the predefined software bug based on the software bugs deployed to the corresponding client computing systems 30. If so, the method 500 proceeds to block 520 and updates the score of the first client computing system 30-1; otherwise the method 500 proceeds to block 525.

Referring to FIGS. 1, 2A-2B, 4B, and 4D, at block 525, the instance 93 determines whether there are new entries in the feed (e.g., the instance 93 determines whether additional machine-readable instructions of the first client computing system 30-1 are available for download). If so, the method 500 proceeds to block 530, where the first client computing system 30-1 downloads the new application services and/or traffic captures and then proceeds to block 505. Otherwise, the method 500 proceeds to block 535.

Referring to FIGS. 1, 2A-2B, and 4B, at block 535, the instance 93 determines whether the simulation session has elapsed. If so, the method 500 ends; otherwise, the method 400 proceeds to block 505.

With reference to FIG. 4C, a flow diagram of an illustrative method 600 of the administrative computing system 20 dynamically deploying software bugs to the client computing systems 30 during a simulation session is depicted. While the blocks shown in FIG. 4C are shown as all-occurring and in a particular order, in other embodiments, one or more of the blocks may not be performed, and in some embodiments, one or more of the blocks may be performed in a different order as shown and described herein. Furthermore, while certain blocks shown in FIG. 4C are described as being executed by the administrator 40 using the administrative computing system 20, it should be understood that some or all of the functions described in the blocks of FIG. 4C may be executed solely by the administrative computing system 20 (e.g., the administrative computing system 20 may be an AI computing system that executes the functionality described in FIG. 4C using machine-learning and/or deep-learning algorithms and without input from the administrator 40).

Referring to FIGS. 1, 2A-2B, and 4C, at block 605, the administrator 40 or the administrative computing system 20 determines whether the predefined software bugs submitted by the users 50 are verified. As a non-limiting example, the administrator 40 or the administrative computing system 20 may determine whether the users 50-1 have properly identified and corrected or exploited the predefined software bug based on the software bugs deployed to the corresponding client computing systems 30. As another non-limiting example, the administrative computing system 20 verifies the predefined software bugs if a percentage of the client computing systems 30 have successfully located and exploited the predefined software bugs, wherein the percentage is greater than a predetermined threshold percentage. If so, the method 600 proceeds to block 610; otherwise the method 600 remains at block 605.

Referring to FIGS. 1, 2A-2B, and 4C, at block 610, the administrator 40 selects, using the service creation module 72 and/or the traffic capture module 74 of the administrative computing system 20, new predefined software bugs, application services, and/or network traffic services to deploy to the respective client computing systems 30. Referring to FIGS. 1, 2A-2B, and 4C, at block 615, the administrator 40 deploys, using the container manager module 66 of the administrative computing system 20, the new predefined software bugs, application services, and/or network traffic services to the corresponding client computing system 30. Referring to FIGS. 1, 2A-2B, and 4C, at block 620, the administrative computing system 20 determines whether the simulation session has elapsed. If so, the method 600 ends; otherwise, the method 600 proceeds to block 605.

Upon completion of the simulation session (e.g., one of method 400 of FIG. 4A, method 500 of FIG. 4B, and method 600 of FIG. 4C ending), the scoring module 68 of the administrative computing system 20 may generate and report a score for each of the client computing systems 30. Subsequently, the administrative computing system 20 may rank and generate a report indicating the ranking of each of the client computing systems 30. In some embodiments, the scoring module 68 may adjust (e.g., decrease) the score for one of the client computing systems 30 in response to the service level agreement checker module 76 determining that the respective client computing system was offline for a period of time that is greater than a predefined threshold value.

It should now be understood that the embodiments described herein relate to devices, systems, and methods for identifying predefined software bugs using the client computing systems 30. As described above, the users 50 of each of the client computing systems 30 (or one or more of the client computing systems 30 without user intervention) may evaluate their respective deployed machine-readable instructions, locate and correct the predefined software bugs, and submit the corrected predefined software bugs for verification during a simulation session. In response to the administrator 40 and/or administrative computing system 20 verifying that the users 50 of the corresponding client computing system 30 have properly corrected the predefined software bug, the administrative computing system 20 increases a score associated with the corresponding client computing systems 30.

Furthermore, users 50 of each of the client computing systems 30 (or one or more of the client computing systems 30 without user intervention) may evaluate machine-readable instructions deployed to other client computing systems 30, locate and exploit the predefined software bugs of the other client computing systems 30, and submit the exploited predefined software bugs for verification. In response to the administrator 40 and/or administrative computing system 20 verifying that the users 50 of the corresponding client computing system 30 have properly exploited the predefined software bug, the administrative computing system 20 increases a score associated with the corresponding client computing systems 30.

Accordingly, the software bug detection system 10 enables users 50 and/or client computing systems 30 to improve their ability to diagnose various computing system issues that may arise due to malicious third party actions, such as memory corruption issues, memory vulnerability issues, memory disclosure issues, information leakage issues, logic vulnerability issues, cryptographic issues, and/or the like.

The functional blocks and/or flowchart elements described herein may be translated into machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It will be apparent to those skilled in the art that various modifications and variations can be made without departing from the scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A method comprising:
   receiving, using a first client computing system, an instance from an administrative computing system, wherein:
   the instance comprises a partition of computing resources of the administrative computing system;
   the partition of computing resources comprises a virtual processor and first machine-readable instructions; and
   the first machine-readable instructions comprise a first predefined software bug, wherein the first predefined software bug is compiled at a first memory location such that a subsequent iteration of machine-readable instructions comprising a predefined software bug is compiled at a different memory location;
   executing, using the virtual processor, the first machine-readable instructions, wherein executing the first machine-readable instructions comprises:
   receiving, using the virtual processor, a first input indicating an identification of the first predefined software bug of the first machine-readable instructions; and
   transmitting, using the virtual processor, a first signal associated with the first input to the administrative computing system, wherein the first signal causes the administrative computing system to generate a score associated with the first client computing system in response to verification by the administrative computing system.

2. The method of claim 1, wherein:
   the partition of computing resources comprises second machine-readable instructions;
   the second machine-readable instructions comprise a second predefined software bug; and
   the second machine-readable instructions are associated with a second client computing system communicatively coupled to the first client computing system and the administrative computing system.

3. The method of claim 2, further comprising:
   receiving, using the virtual processor, a second input indicating an identification of the second predefined software bug of the second machine-readable instructions; and
   transmitting, using the virtual processor, a second signal associated with the second input to the administrative computing system, wherein the second signal causes the administrative computing system to increase the score associated with the first client computing system.

4. The method of claim 3, further comprising:
   displaying, using the first client computing system, a user interface, wherein:
   the user interface comprises a first user interface element that causes the virtual processor to receive the first input in response to selection of the first user interface element;
   the user interface comprises a second user interface element that causes the virtual processor to receive the second input in response to selection of the second user interface element; and
   the user interface comprises a text user interface element; and
   displaying, using the first client computing system, a binary file within the text user interface element, the binary file representing one of a set of the first machine-readable instructions and a set of the second machine-readable instructions.

5. The method of claim 4, wherein receiving the first input indicating the identification of the first predefined software bug of the first machine-readable instructions further comprises:
   receiving, using the virtual processor, a modification of the binary file, wherein the binary file represents the set of the first machine-readable instructions; and
   receiving, using the virtual processor, the selection of the first user interface element in response to the modification of the binary file.

6. The method of claim 4, wherein receiving the second input indicating the identification of the second predefined software bug of the second machine-readable instructions further comprises:
   receiving, using the virtual processor, a modification of the binary file, wherein the binary file represents the set of the second machine-readable instructions; and
   receiving, using the virtual processor, the selection of the second user interface element in response to the modification of the binary file.

7. The method of claim 4, wherein:
   the set of the first machine-readable instructions comprises the first predefined software bug; and
   the set of the second machine-readable instructions comprises the second predefined software bug.

8. The method of claim 1, wherein the first predefined software bug is selected from a list of predefined software bugs.

9. A method comprising:
receiving, using a first client computing system, an instance from an administrative computing system, wherein:
the instance comprises a partition of computing resources of the administrative computing system;
the partition of computing resources comprises a virtual processor and first machine-readable instructions; and
the first machine-readable instructions comprise a first predefined software bug, wherein the first predefined software bug is compiled at a first memory location such that a subsequent iteration of machine-readable instructions comprising a predefined software bug is compiled at a different memory location;
executing, using the virtual processor, the first machine-readable instructions, wherein executing the first machine-readable instructions comprises:
generating, using the virtual processor, a first input indicating an identification of the first predefined software bug of the first machine-readable instructions; and
transmitting, using the virtual processor, a first signal associated with the first input to the administrative computing system, wherein the first signal causes the administrative computing system to generate a score associated with the first client computing system in response to verification by the administrative computing system.

10. The method of claim 9, wherein:
the partition of computing resources comprise second machine-readable instructions;
the second machine-readable instructions comprise a second predefined software bug; and
the second machine-readable instructions are associated with a second client computing system communicatively coupled to the first client computing system and the administrative computing system.

11. The method of claim 10, further comprising:
generating, using the virtual processor, a second input indicating an identification of the second predefined software bug of the second machine-readable instructions; and
transmitting, using the virtual processor, a second signal associated with the second input to the administrative computing system, wherein the second signal causes the administrative computing system to increase the score associated with the first client computing system.

12. The method of claim 11, wherein generating the first input indicating the identification of the first predefined software bug of the first machine-readable instructions further comprises:
modifying, using the virtual processor, a binary file, wherein:
the binary file represents a set of the first machine-readable instructions; and
the set of the first machine-readable instructions comprises the first predefined software bug.

13. The method of claim 11, wherein generating the second input indicating the identification of the second predefined software bug of the second machine-readable instructions further comprises:
modifying, using the virtual processor, a binary file, wherein:
the binary file represents a set of the second machine-readable instructions; and
the set of the second machine-readable instructions comprises the second predefined software bug.

14. A method comprising:
transmitting, using an administrative computing system, a first instance to a first client computing system, wherein:
the first instance comprises a first partition of computing resources of the administrative computing system;
the first partition of computing resources comprises a first virtual processor and first machine-readable instructions; and
the first machine-readable instructions comprise a first predefined software bug, wherein the first predefined software bug is compiled at a first memory location such that a subsequent iteration of machine-readable instructions comprising a predefined software bug is compiled at a different memory location;
receiving, using the administrative computing system, a first signal associated with a first input received by the first client computing system, wherein the first input indicates an identification of the first predefined software bug of the first machine-readable instructions;
verifying, using the administrative computing system, the first signal; and
increasing, using the administrative computing system, a first score associated with the first client computing system in response to verification of the first signal.

15. The method of claim 14, further comprising:
transmitting, using the administrative computing system and in response to verification of the first signal, second machine-readable instructions to the first client computing system, wherein the second machine-readable instructions comprise a second predefined software bug.

16. The method of claim 15, further comprising:
receiving, using the administrative computing system, a second signal associated with a second input received by the first client computing system, wherein the second input indicates an identification of the second predefined software bug of the second machine-readable instructions;
verifying, using the administrative computing system, the second signal; and
increasing, using the administrative computing system, the first score associated with the first client computing system in response to verification of the second signal.

17. The method of claim 14, further comprising:
transmitting, using the administrative computing system, a second instance to a second client computing system, wherein:
the second instance comprises a second partition of computing resources of the administrative computing system;
the second partition of computing resources comprises a second virtual processor and second machine-readable instructions; and
the second machine-readable instructions comprise a second predefined software bug;
receiving, using the administrative computing system, a second signal associated with a second input received by the second client computing system, wherein the second input indicates an identification of the second predefined software bug of the second machine-readable instructions;

verifying, using the administrative computing system, the second signal; and increasing, using the administrative computing system, a second score associated with the second client computing system in response to verification of the second signal.

18. The method of claim 14, further comprising:

initiating, using the administrative computing system, a session timer;

transmitting, using the administrative computing system, second machine-readable instructions to the first client computing system in response to a value of the session timer being greater than a threshold value;

receiving, using the administrative computing system, a second signal associated with a second input received by the first client computing system, wherein the second input indicates a correction of a second predefined software bug of the second machine-readable instructions;

verifying, using the administrative computing system, the second signal; and increasing, using the administrative computing system, the first score associated with the first client computing system in response to verification of the second signal.

19. The method of claim 18, further comprising resetting the session timer in response to the value of the session timer being greater than the threshold value.

20. The method of claim 14, further comprising decreasing, using the administrative computing system, the first score associated with the first client computing system in response to a determination that the first client computing system is offline for a predefined time period.

* * * * *